INVENTORS
ROBERT H. PARKER
WILLIAM A. RORISON
BY

ATTORNEY

July 6, 1965   R. H. PARKER ETAL   3,193,219
FLIGHT CONTROL SYSTEMS
Filed Nov. 1, 1961   2 Sheets-Sheet 2

INVENTORS
ROBERT H. PARKER
WILLIAM A. RORISON
BY
Henry Huff
ATTORNEY

United States Patent Office

3,193,219
Patented July 6, 1965

3,193,219
FLIGHT CONTROL SYSTEMS
Robert H. Parker, Phoenix, Ariz., and William A. Rorison, San Diego, Calif., assignors to Sperry Rand Corporation, Great Neck, N.Y., a corporation of Delaware
Filed Nov. 1, 1961, Ser. No. 149,353
11 Claims. (Cl. 244—77)

This invention relates in general to flight control systems and more particularly to apparatus for automatically trimming aircraft control surfaces.

For ease of understanding, the discussion will be confined to apparatus for trimming an aircraft elevator. However, it is to be understood that the discussion relates equally well to apparatus for trimming any aircraft control surface.

In trimming an aircraft elevator automatically, the command signal that is applied to the elevator control motor is applied also to a trim tab control motor which counterpositions the elevator trim tab, thereby trimming the elevator by cancelling the steady hinge moment about the pivot point of the elevator.

In automatic trimming apparatus such as were developed early, the command signal is applied simultaneously to the field windings, connected in parallel, of the elevator control motor and the trim tab motor. So long as the elevator control motor field winding does not open, the system operates properly, or at least safely. If, however, such winding does open, the command signal is applied to and drives only the trim tab motor. This causes the tab to behave like an elevator; since the tab moves counter to the direction that the elevator moves in response to a given command signal, such behavior results in a dangerous condition of flight.

To avoid the aforementioned dangerous possibility, present practice is to connect the field windings of the motors in series. Therefore, in the event the field winding of the elevator control motor opens, both motors become inoperative. While such series connection of field windings eliminates one problem in automatic trimming apparatus, it enhances another, viz. keeping the trim tab from being operated prior to the time that the elevator itself is operated. Such premature operation of the trim tab is a problem for the following reason: the elevator control motor is essentially a positioning device whereas the trim servo is essentially an integrator. If the trim servo were to operate at a lower level than the elevator control servo, the phase lag associated with the trim motor integration will create oscillatory operation of the control surfaces. With the parallel connection of field windings mentioned above, a delay device can be connected in series with the field winding of the trim tab motor to prevent the trim tab from being operated prematurely. With the series connection of field windings, however, a delay device will be ineffective because it will affect both motors, i.e. cause a delay in the operation of both the trim tab and the elevator.

The present invention permits the preferable serial connection of motor windings while assuring that the trim tab is not operated until after the elevator has started to move. In accordance with the invention, the command signal is applied to the serial connection of field windings, power being applied to the armature winding of only the elevator control motor. A threshold device also receives the command signal and operates to apply power to the armature winding of the trim tab motor only after the applied command signal exceeds a predetermined level, i.e. a level at which the elevator is assured of being first in operation.

In the presently preferred form of the invention, a failure indicating lamp is also provided and lit when the command signal exceeds a certain level, such level being decreased whenever the craft landing flaps are lowered. This assures that the pilot will be alerted to failures quickly during landing maneuvers.

A principal object of the present invention is to provide apparatus for automatically trimming an aircraft control surface.

Another object of the invention is to provide apparatus for assuring that a trim tab is not operated before its associated control surface.

Another object of the invention is to provide automatic trimming apparatus that indicates when malfunctions therein occur, such indications being sooner when the craft landing flaps are extended.

Another object of the invention is to provide apparatus for assuring that a control surface trim tab on an aircraft employing a variable gain flight control system does not operate before its associated control surface.

The invention will be described with reference to the figures wherein.

Figure 1:
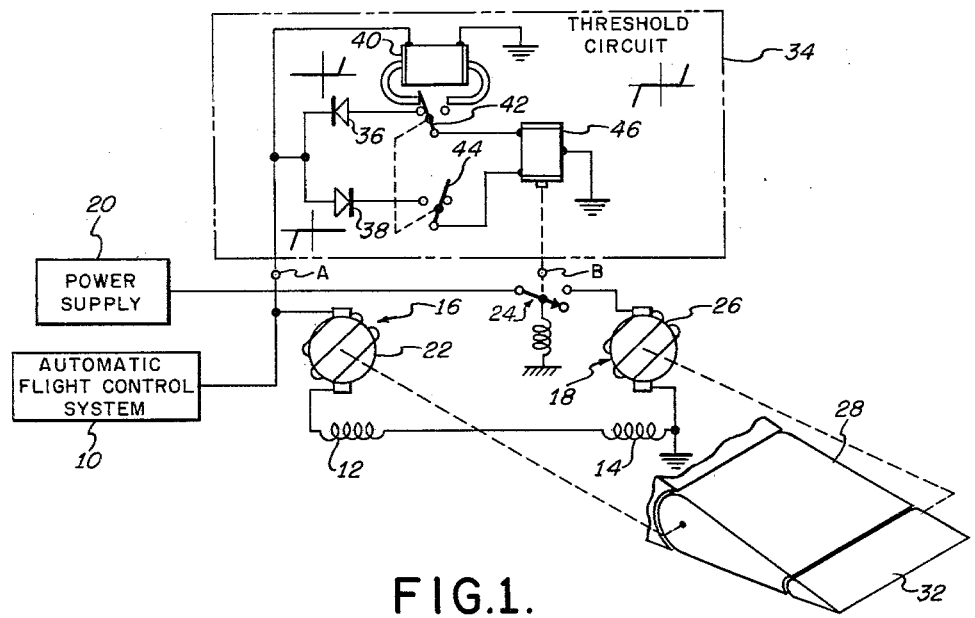
FIG. 1 is a schematic diagram of apparatus embodying the invention.

Referring to FIG. 1 an automatic flight control system 10 applies its output signal to a series wound elevator control motor 16, i.e. the motor 16 has its field winding 12 and its armature 22 excited by the flight control system 10 output signal. The field winding 14 of a trim tab motor 18 is connected in series with such elevator control motor windings and, therefore, also receives the automatic flight control system output signal. A source of electrical power 20 separately excites the armature 26 of the trim tab motor 18 when a normally open switch 24 is closed. The motor 16 connects to and operates to position an aircraft elevator 28; the motor 18 connects to and operates to counterposition an elevator trim tab 32.

A threshold circuit 34 receives the output signal from the automatic flight control system 10 and operates to close the switch 24 when the flight control system 10 output signal exceeds a predetermined level. The threshold circuit 34 has a pair of zener diodes 36 and 38 which receive the automatic flight control system 10 output signal; a polarized relay 40 also receives that signal. When the flight control system 10 output signal has a positive polarity, the relay 40 holds the switches 42 and 44 in the positions shown; when that signal has a negative polarity the switches 42 and 44 are moved respectively to their other positions. A grounded center tap relay 46 receives the output signals from the diodes 36 and 38 and, when energized, operates to close the switch 24.

When the automatic flight control system 10 starts to have an output signal of positive polarity, the elevator 28 starts to drive in a particular direction because such signal is applied simultaneously to the field and armature windings of the elevator control motor 16. As the signal continues to build up, a point is reached at which the zener diode 36 ceases to prevent a current from passing therethrough, thereby energizing the relay 46 and closing the switch 24. When this occurs, power is applied to the armature 26 of the trim tab motor 18 to allow, only then, that motor to counterposition the trim tab and effect automatic trimming of the elevator 28. An automatic flight control system output signal of negative polarity similarly passes through the zener diode 38 to effect timely automatic trimming of the elevator 28.

With an open circuit in either the armature winding 22 or field winding 12 of the elevator control motor, the trim tab motor 18 becomes disabled because no signal can be applied to its field winding. Therefore, regardless of whether the switch 24 is open or closed (by an automatic flight control system 10 output signal), dangerous operation of the trim tab 32 in response to a flight control system 10 output signal cannot occur. With the elevator control motor field and armature windings intact, the trim tab motor 18 cannot operate until the switch 24 closes, i.e. when the relay 46 becomes energized by an automatic flight control system output signal of a particular level.

Figure 2:
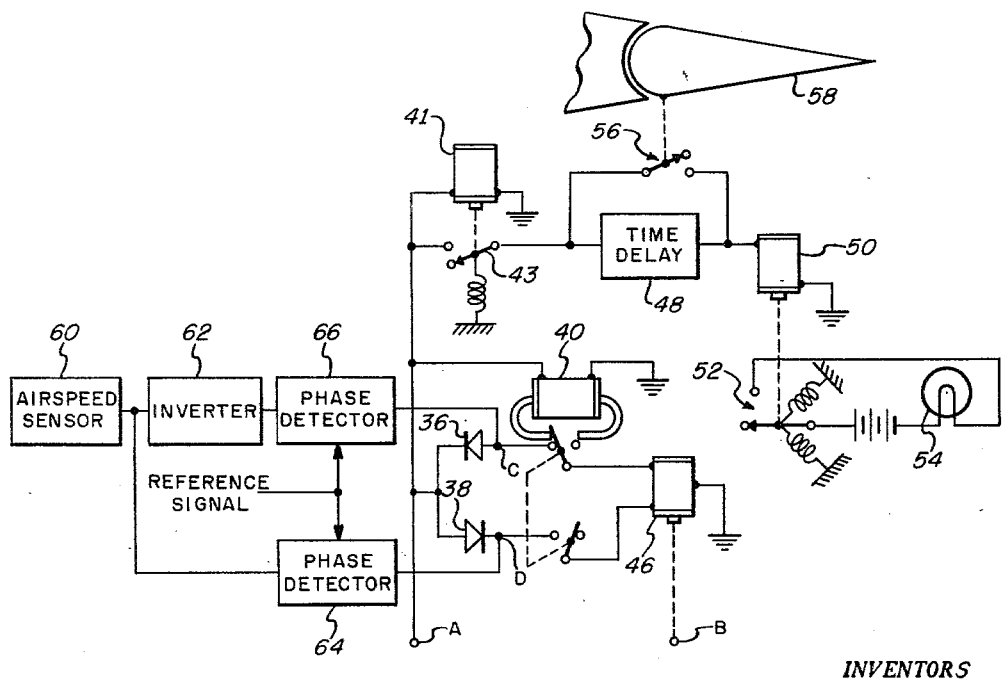
FIG. 2 is a diagram which, when substituted for a portion of FIG. 1, provides a presently preferred embodiment of the invention.

The apparatus of FIG. 2 may be substituted for the threshold circuit 34 of FIG. 1 to provide the following features: detection of malfunctions in the automatic trim system, such detection being sooner when malfunctions occur during landing maneuvers; variation in the magnitude of the threshold as a direct function of air speed to compensate for changes in the gain of the flight control system as an inverse function of air speed.

In FIG. 2, the flight control system 10 output signal which is applied to the diodes 36 and 38 and to the polarized relay 40 is applied also, through a time delay 48, to a relay 50 when it exceeds a predetermined level, relay 41 and switch 43 determining that level. In order for the relay 50 to actuate, its applied signal must exceed the predetermined level for a time determined by the time delay 48. Depending on the signal applied to the relay 50, a switch 52 is moved to light a lamp 54. A normally open switch 56, creating, when closed, a short circuit across the time delay 48, is closed when a landing flap 58 is lowered from its streamlined position, thereby energizing the relay 50 sooner under such condition.

If the automatic flight control system 10 has its gain varied inversely with air speed, its output signal, i.e. the signal applied to the diodes 36 and 38, will cause the switch 24 to be closed sooner or later depending on the craft air speed. Since an object of the invention, i.e. preventing a trim tab from moving before its associated elevator, depends on a timely closing of the switch 24, apparatus embodying the present invention, when employed with such a variable gain flight control system, varies the signal threshold at which the relay 46 may be energized. For increasing air speeds (decreasing flight control system gain) the threshold is small; for decreasing air speeds (increasing flight control system gain) the threshold is substantial.

Figure 3:
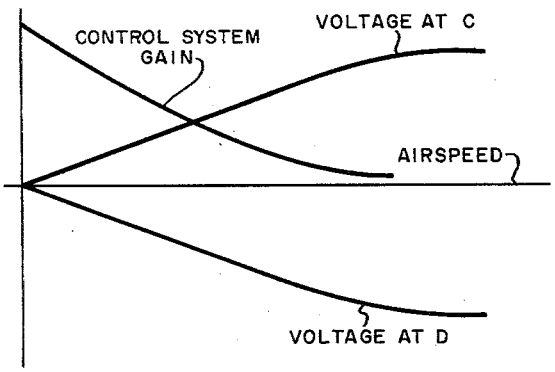
FIGS. 3 and 4 are diagrams useful in describing the presently preferred embodiment of the invention.
Figure 4:
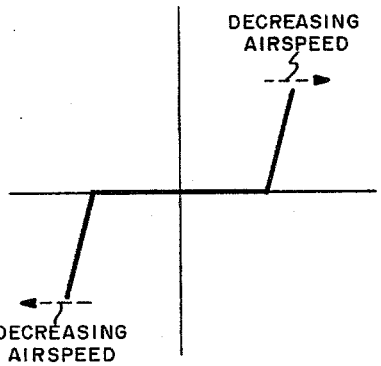

To provide the variable threshold, etc., forward biasing voltages that vary directly with air speed are applied to the diodes 36 and 38. In deriving such biasing voltages, the output signal from the craft air speed sensor 60, e.g. a sensor of the type shown and described in U.S. Patent 2,598,681, issued in the name of R. F. Garbarini et al., and assigned to the assignee of this invention, is applied to a signal inverter 62 (such as a transformer or amplifier) and a phase detector 64. A phase detector 66 receives the output signal from the inverter 62. To each phase detector 64 and 66, the same reference signal is applied, such reference signal having the same frequency as the output signal from the air speed sensor 60. The phase detectors 64 and 66 are so adapted as to apply forward biasing output voltages respectively to the diodes 38 and 36 as stated above, whereby the zener threshold of each diode is decreased and increased as air speed respectively increases and decreases. FIG. 3 shows diagrammatically how the forward biasing voltages applied to the diodes 36 and 38 at points C and D respectively vary with air speed. FIG. 4 shows diagrammatically the effect of such biasing on the threshold.

Because the relay 41 is left responsive to the control system signal in disregard of the control system gain, the lamp 54 desirably will light sooner at low air speeds than at high air speeds. In other words, at low speeds (e.g. as are had during landings) the pilot should be very quickly made aware of any malfunction in the main elevator motor 16 so that he may instantly take corrective action. Since the relay 41 is responsive solely to the level of its applied signal, i.e. the flight control system 10 output signal, actuation thereof in response to a gradual buildup of such signal to the aforementioned level will occur sooner when the system 10 gain (low speeds) is high, than when such gain is low (high speeds), which is as it should be.

Figure 5:
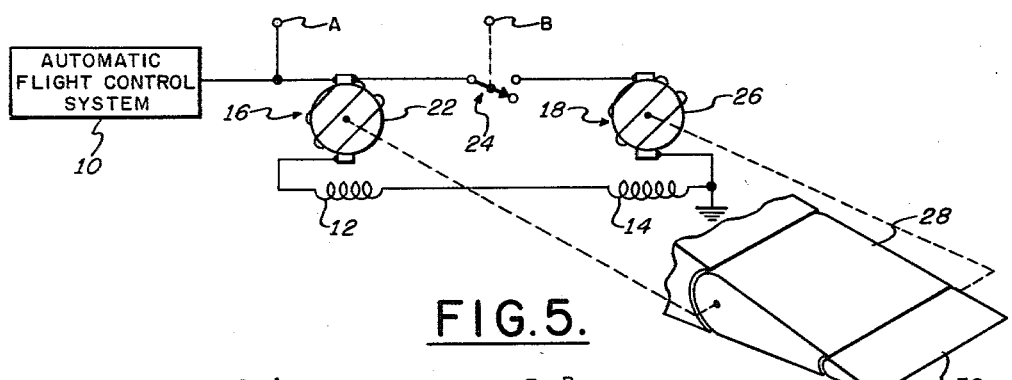
FIG. 5 is a schematic diagram showing a species of the invention.
Figure 6:
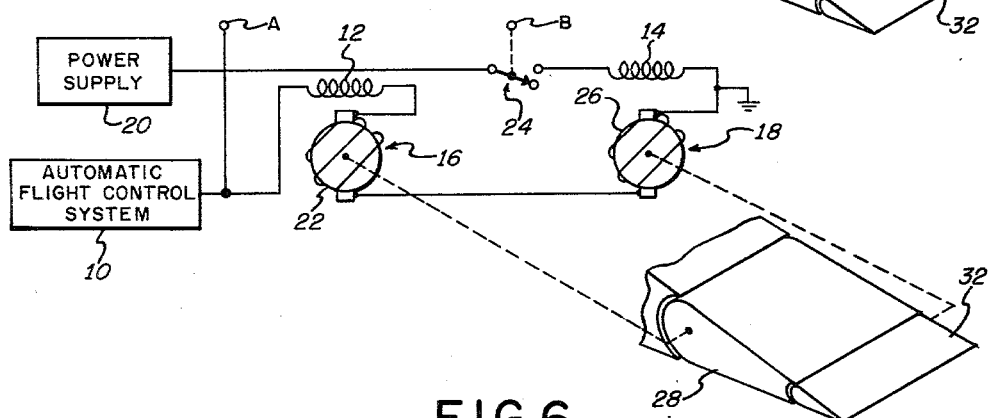
FIG. 6 is a schematic diagram of another species of the invention.

As shown in FIG. 5, the apparatus of FIG. 1 may be modified to obviate the need for separately exciting the armature 26 of the trim tab motor 18. In FIG. 5, the automatic flight control system 10 output signal, in addition to being applied to the series wound elevator control motor and the trim tab motor field winding, is applied also in parallel to the armature 26 of the trim tab motor 18 when the switch 24 is closed; this, thereby, makes the trim tab motor a shunt wound motor, the windings of which are excited by the automatic flight control system 10 output signal. FIG. 6 shows another form of the invention in which the output signal from the automatic flight control system 10 is applied to and excites the field and armature windings of the elevator control motor 16 and the armature winding of the trim tab motor 18 which are all connected in series. However, in this embodiment, the field winding of the trim tab motor 18 is separately excited when the output signal from the automatic flight control system 10 exceeds a predetermined level as described above.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for automatically trimming an aircraft control surface having a movable trim member, said surface being operated in response to a control signal from a flight control system comprising an electric control surface motor having a field winding and an armature winding, an electric trim motor having a field winding and an armature winding and being adapted to drive said trim member, one of said control surface motor windings being serially connected with one of said trim motor windings, the series connection of windings being excited by said control signal, means exciting the other of said control surface motor windings, and means also receiving said control signal responsive when said control signal has a certain magnitude to excite the other of said trim motor windings.

2. Apparatus for use with a flight control system for automatically trimming an aircraft control surface having a trim tab comprising a first motor adapted to operate said surface and a second electric motor adapted to operate said tab, each of said motors having a field winding and an armature winding, one of said first motor windings being connected in series with a winding of said second motor, said series connection of motor windings being adapted to be excited by the output signal from said flight control system, means exciting the other of said first motor windings, and means also receiving the output signal from said flight control system responsive when that signal reaches a predetermined level to excite the other of said second motor windings.

3. Apparatus for use in an aircraft flight control system to trim automatically a control surface having a trim tab comprising a first electric motor adapted to operate the control surface, a second electric motor adapted to operate the tab, each of said motors having a field winding and an armature winding, one winding of said first motor and one winding of said second motor being connected serially and being excited simultaneously by a control surface command signal, means exciting the other of said first motor windings, and means also receiving said control surface command signal, said last named means being adapted to excite the other of said second motor windings when said control surface command signal exceeds a predetermined level.

4. Apparatus for automatically trimming an aircraft control surface having a trim tab, said surface being operated in response to a control signal from a flight control system comprising an electric control surface motor having a field winding and an armature winding, an electric trim tab motor having a field winding and an armature winding and being adapted to drive said trim tab, one of said control surface motor windings being serially connected with one of said trim tab motor windings, the series connection of windings being excited by said control signal, means exciting the other of said control surface motor windings, and means also receiving said control signal responsive when said signal has a certain magnitude to excite the other of said trim tab motor windings.

5. Apparatus for use with a flight control system for automatically trimming an aircraft control surface having a trim tab comprising a first motor adapted to operate said surface and a second electric motor adapted to operate said tab, each of said motors having a field winding and an armature winding, said field windings being serially connected and adapted to be excited by the output signal from the flight control system, means exciting the first motor armature winding and means also receiving the flight control system signal responsive when that signal reaches a predetermined level to excite the second motor armature winding.

6. Apparatus for use in an aircraft flight control system to trim automatically a control surface having a trim tab comprising a first electric motor adapted to operate the control surface, a second electric motor adapted to operate the tab, each of said motors having a field winding and an armature winding, said first motor field winding and second motor field winding being serially connected and being excited simultaneously by a control surface command signal, said command signal also exciting the armature winding of said first motor, and means responsive when said surface command signal reaches a predetermined magnitude to excite the armature winding of said second motor.

7. Apparatus for use in an aircraft flight control system to trim automatically a control surface having a trim tab comprising a first electric motor adapted to operate the control surface, a second electric motor adapted to operate the tab, each of said motors having a field winding and an armature winding, said first motor field winding and second motor field winding being serially connected and being excited simultaneously by a control surface command signal, said command signal also exciting the armature winding of said first motor, and means responsive when said surface command signal reaches a predetermined magnitude to apply that signal to the armature winding of said second motor.

8. Apparatus for use with a flight control system for automatically trimming an aircraft control surface having a trim tab comprising a first motor adapted to operate said surface and a second electric motor adapted to operate said tab, each of said motors having a field winding and an armature winding, one of said first motor windings being connected in series with a winding of said second motor, means exciting said series connection of motor windings, said other of said first motor windings being adapted to have applied thereto the output signal from said flight control system, and means responsive when said signal reaches a predetermined level to apply that signal to the other of said second motor windings.

9. Apparatus for automatically trimming an aircraft control surface having a trim tab, said surface being operated in response to a control signal from a flight control system, the gain of which decreases and increases when air speed increases and decreases respectively, comprising an electric control surface motor having a field winding and an armature winding, an electric trim tab motor having a field winding and an armature winding and being adapted to drive said tab, one of said control surface motor windings being serially connected with one of said trim tab motor windings, the series connection of windings being excited by said control signal, means exciting the other of said control surface motor windings, means responsive when said control signal has a certain magnitude to excite the other of said trim tab motor windings, and means responsive to air speed changes to increase and decrease the signal magnitude at which said last named means is responsive when said air speed decreases and increases respectively.

10. Apparatus for use in an aircraft flight control system to trim automatically a control surface having a trim tab comprising a first electric motor adapted to operate the control surface, a second electric motor adapted to operate the tab, each of said motors having a field winding and an armature winding, one winding of said first motor and one winding of said second motor being connected serially and being excited simultaneously by a control surface command signal, means exciting the other of said first motor windings, means responsive when said control surface command signal exceeds a first predetermined level to excite the other of said second motor windings, an indicator responsive to indicate when said control surface command signal reaches a second predetermined level, and means making said indicator responsive sooner when the landing flaps of the aircraft are extended than when said flaps are not extended.

11. Apparatus for use with a flight control system, the gain of which decreases and increases when air speed increases and decreases respectively, for automatically trimming an aircraft control surface having a trim tab, comprising a first motor adapted to operate said surface and a second electric motor adapted to operate said tab, each of said motors having a field winding and an armature winding, one of said first motor windings being connected in series wtih a winding of said second motor, said series connection of motor windings being adapted to be excited by the output signal from said flight control system, means exciting the other of said first motor windings, means responsive when the output signal from said flight control system reaches a predetermined level to excite the other of said second motor windings, an indicator responsive to indicate when said control surface command signal reaches a second predetermined level, and means making said indicator responsive sooner when the landing flaps of the aircraft are extended than when said flaps are not extended.

References Cited by the Examiner
UNITED STATES PATENTS 2,957,652  10/60  Masel _____ 244—77
2,988,306  6/61   Kutzler _____ 244—78

FERGUS S. MIDDLETON, *Primary Examiner.*